United States Patent [19]

Gorman

[11] Patent Number: 4,645,409

[45] Date of Patent: * Feb. 24, 1987

[54] OUTER ARM ASSEMBLY FOR INDUSTRIAL ROBOT

[75] Inventor: Robert H. Gorman, Clinton, Pa.

[73] Assignee: American Cimflex Corporation, Pittsburgh, Pa.

[ * ] Notice: The portion of the term of this patent subsequent to Jan. 3, 2001 has been disclaimed.

[21] Appl. No.: 641,717

[22] Filed: Aug. 16, 1984

Related U.S. Application Data

[63] Continuation-in-part of Ser. No. 524,839, Aug. 19, 1983, Pat. No. 4,552,505, which is a continuation-in-part of Ser. No. 443,156, Nov. 19, 1982, which is a continuation-in-part of Ser. No. 346,222, Feb. 5, 1982, Pat. No. 4,424,473.

[51] Int. Cl.$^4$ ............................................. B25J 9/00
[52] U.S. Cl. .................................. 414/735; 318/568; 901/21; 901/23; 901/29
[58] Field of Search ................. 901/14, 15, 21, 23–26, 901/28, 29, 38; 414/735, 719; 318/568

[56] References Cited

U.S. PATENT DOCUMENTS

| | | | |
|---|---|---|---|
| 2,006,172 | 6/1935 | Klappauf | 310/166 |
| 2,459,253 | 1/1949 | Tyrner | 318/8 |
| 3,146,386 | 8/1964 | Gerber | 318/8 |
| 3,201,156 | 8/1965 | Coats | 285/365 |
| 3,817,403 | 6/1974 | Glachet et al. | 414/735 |
| 3,922,930 | 12/1975 | Fletcher et al. | 414/1 X |
| 3,967,837 | 7/1976 | Westerland et al. | 285/365 X |
| 3,985,238 | 10/1976 | Nakura et al. | 414/735 |
| 4,062,455 | 12/1977 | Flatau | 414/735 |
| 4,068,536 | 1/1978 | Stackhouse | 74/417 |
| 4,068,763 | 1/1978 | Fletcher et al. | 414/4 |
| 4,181,465 | 1/1980 | Ridderstrum | 414/590 X |
| 4,246,661 | 1/1981 | Pinson | 3/1.1 |
| 4,289,996 | 9/1981 | Barnes et al. | 318/38 |
| 4,300,198 | 11/1981 | Davini | 364/513 |
| 4,370,091 | 1/1983 | Gagliardi | 414/735 |
| 4,392,776 | 7/1983 | Shum | 414/744 R |
| 4,398,110 | 8/1983 | Flinchbaugh et al. | 414/4 X |
| 4,425,818 | 1/1984 | Asada et al. | 74/469 |
| 4,459,898 | 7/1984 | Harjar et al. | 414/4 X |

FOREIGN PATENT DOCUMENTS

| | | |
|---|---|---|
| 0044737 | 1/1982 | European Pat. Off. . |
| 86054 | 8/1983 | European Pat. Off. . |
| 2224349 | 11/1973 | Fed. Rep. of Germany . |
| 2228598 | 1/1974 | Fed. Rep. of Germany . |
| 2516471 | 10/1976 | Fed. Rep. of Germany . |
| 2851958 | 6/1979 | Fed. Rep. of Germany ........ 901/23 |
| 2754609 | 6/1979 | Fed. Rep. of Germany . |
| 1396523 | 12/1965 | France . |
| 2208762 | 6/1974 | France . |
| 1266080 | 5/1981 | France . |
| 2505239 | 11/1982 | France ................... 901/29 |
| 1180500 | 2/1970 | United Kingdom . |
| 2045720 | 11/1980 | United Kingdom . |
| 2058009 | 4/1981 | United Kingdom . |
| 707793 | 1/1980 | U.S.S.R. ............................. 414/735 |
| 763082 | 9/1980 | U.S.S.R. . |

OTHER PUBLICATIONS

"Ultra High Torque Motor and Drive System", 4 pages, published by Motornetics Corporation of Santa Rosa, Calif.

"Robotic Manipulator Arm", Apr. 1983, PCT, WO/8301407.

*Primary Examiner*—Joseph E. Valenza
*Assistant Examiner*—Donald W. Underwood
*Attorney, Agent, or Firm*—Bell, Seltzer, Park & Gibson

[57] ABSTRACT

An industrial robot is disclosed which includes three primary drive units defining three separately controlled axes of movement, and an outer arm assembly having three additional drive units for providing three additional axes of movement. The three primary drive units each include an electrical motor which has its rotor and stator each coaxially disposed about the axis of movement, so as to eliminate the need for any torque converting drive train between the motor and output components. The three drive units of the outer arm assembly comprise three electrical motors, and these three motors are serially mounted, with the rotors and stators thereof being coaxially disposed about a common axis, and with the rotors being fixed to respective ones of three coaxially mounted tubular members, which serve to transmit movement to the workpiece engaging gripper of the robot.

10 Claims, 5 Drawing Figures

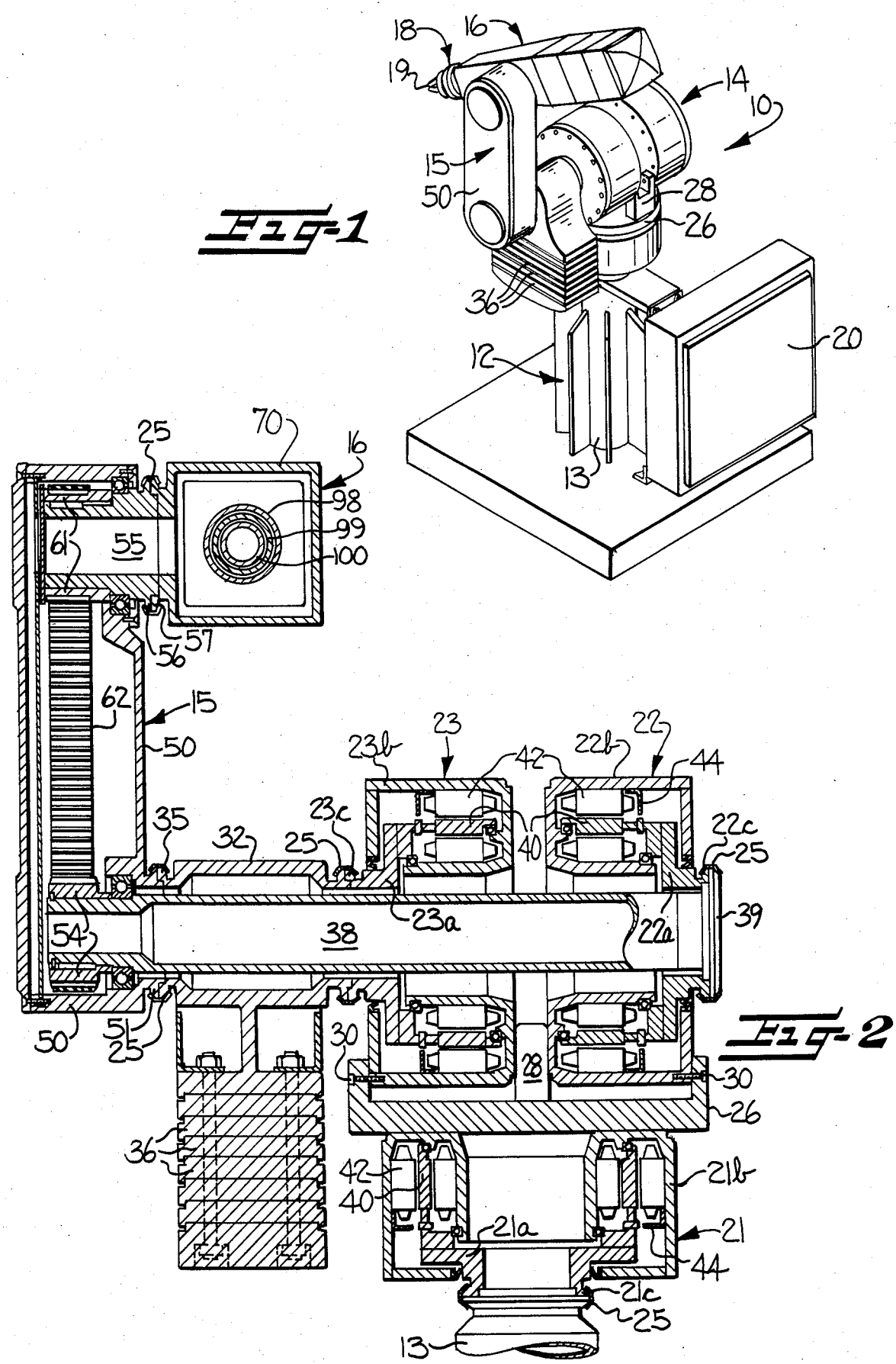

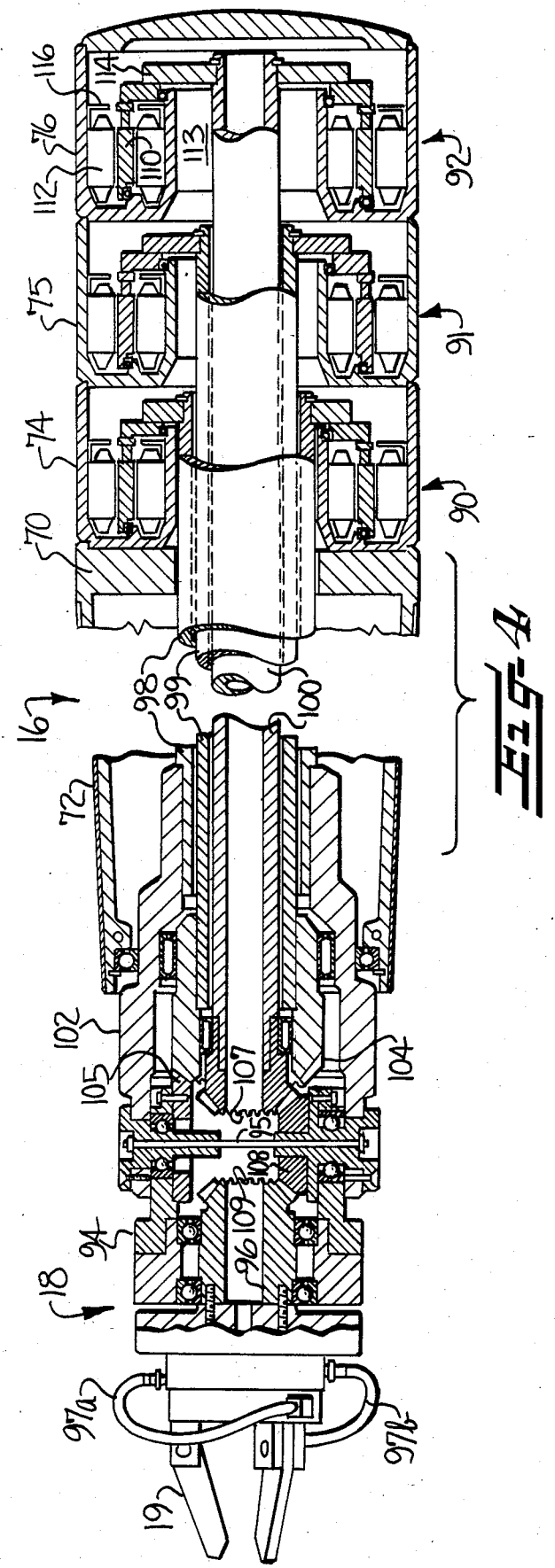
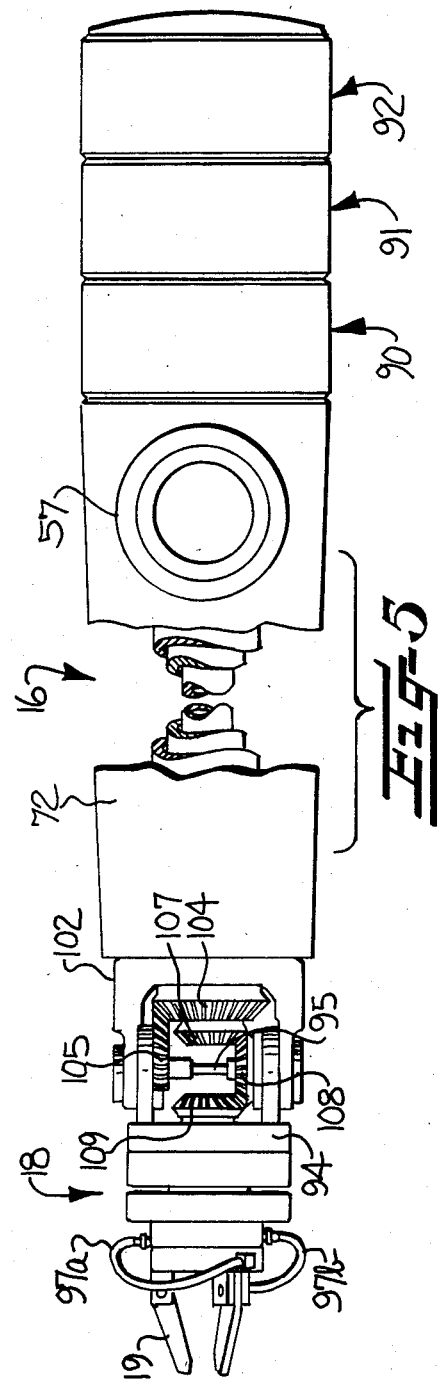

OUTER ARM ASSEMBLY FOR INDUSTRIAL ROBOT

This is a continuation in part of application Ser. No. 524,839 filed Aug. 19, 1983 now U.S. Pat. No. 4,552,505, which in turn is a continuation in part of Ser. No. 443,156, filed Nov. 19, 1982, which in turn is a continuation in part of application Ser. No. 346,222, filed Feb. 5, 1982, now U.S. Pat. No. 4,424,473.

The present invention relates to an industrial robot of the type designed as a replacement for human labor in performing repetitive, hazardous, or tiring work.

Industrial robots of the described type typically have the capability of moving through six axes of movement to manipulate objects, parts, or tools through variable programmed motions for the performance of a variety of tasks. Reprogramable robots are also available which incorporate a computer and microprocessor whereby the robot may be taught to move from point to point using a portable teaching box or the like.

Conventional industrial robots of the type adapted to move through six revolute axes typically include a primary drive system which provides for movement about three primary axes, and an outer arm assembly which is adapted to move a hand assembly through three additional axes of movement. Heretofore, the drive system for each of the three primary axes of movement, and the three axes of movement of the outer arm assembly, included a drive motor and a torque converting drive train composed of gears, drive rods, and the like. As will be apparent, such drive trains are not only expensive, but they introduce limitations on the accuracy of the movements by reason of unavoidable inaccuracies in their design and assembly, and "backlash" which is inherent in the system. Further, the drive trains require substantial alignment and assembly time during fabrication or repair, they increase the opportunity for failure resulting from wear, broken teeth or other components, and they are relatively heavy and bulky.

It is accordingly an object of the present invention to provide an industrial robot of the above type and which incorporates a drive system which avoids the above noted problems associated with the known drive systems.

Additional more particular objects of the present invention include providing a drive system for each of the axes of movement of an industrial robot which is relatively inexpensive, which may be easily assembled and aligned, which may be controlled with a high degree of accuracy, which includes a minimum number of parts which are subject to malfunction, and which is lightweight and compact in design.

These and other objects and advantages of the present invention are achieved in the embodiment illustrated herein by the provision of an industrial robot which includes an outer arm assembly which comprises a supporting housing, a hand assembly including workpiece engaging means, a plurality of coaxially mounted tubular members which define a central axis, means operatively interconnecting a first one of the tubular members with the workpiece engaging means to cause the workpiece engaging means to move about a first axis upon rotation of the first tubular member, and means operatively interconnecting a second one of the tubular members to the workpiece engaging means to cause the workpiece engaging means to move about a second axis upon rotation of the second tubular member. Drive means is also provided for selectively rotating each of the first and second tubular members about the central axis and relative to each other, such drive means comprising first and second electrical motors mounted to the supporting housing, with each motor including a rotor and a stator each disposed coaxially about the central axis and further including a tubular central opening extending coaxially therethrough, with at least one of said tubular members extending through said tubular central opening of at least one of said motors, and with one of either the rotor or stator of each motor being fixed to a respective one of the tubular members and the other of the rotor or stator being fixed to the supporting housing, and such that the motors are serially arranged along said central axis.

In the preferred embodiment, the workpiece engaging means comprises a gripper which is movable about three axes, and the assembly comprises a third coaxial tubular member to cause the gripper to rotate about a third axis upon rotation of the third tubular member. The third tubular member is rotatably driven by a third electrical motor of like construction and coaxially arranged with the first and second motors.

Also in the preferred embodiment, the outer arm assembly is itself mounted for movement about three primary axes of movement, and the robot includes three primary drive units for this purpose. Each of these primary units comprises a base component and a secondary component which is rotatably mounted with respect to the base component to define a rotational axis. The secondary components of the three drive units are fixedly mounted to each other, with the axes of rotation of the second and third drive units being coaxially aligned along an axis which preferably perpendicularly intersects the rotational axis of the first drive unit. Further, each of the drive units includes an electrical motor for relatively rotating the base component and secondary component, with each of such motors comprising a rotor disposed coaxially about the associated rotational axis and being directly fixed to one of either the associated base component or secondary component, and a stator disposed coaxially about the associated rotational axis and being directly fixed to the other of the associated base component or secondary component. Thus the drive units for each of the axes of movement of the robot may be characterized by the absence of a drive train transmission between the outputs of the motors and the associated components of the drive unit.

Some of the objects having been stated, other objects and advantages will appear as the description proceeds, when taken in connection with the accompanying drawings in which FIG. 1 is a perspective view of an industrial robot which embodies the present invention;

FIG. 2 is a sectional side elevation view of the robot;

FIG. 4 is a sectional side elevation view of the outer arm assembly of the robot; and FIG. 5 is a side elevation view of the outer arm assembly in reduced scale.

Figure 3:
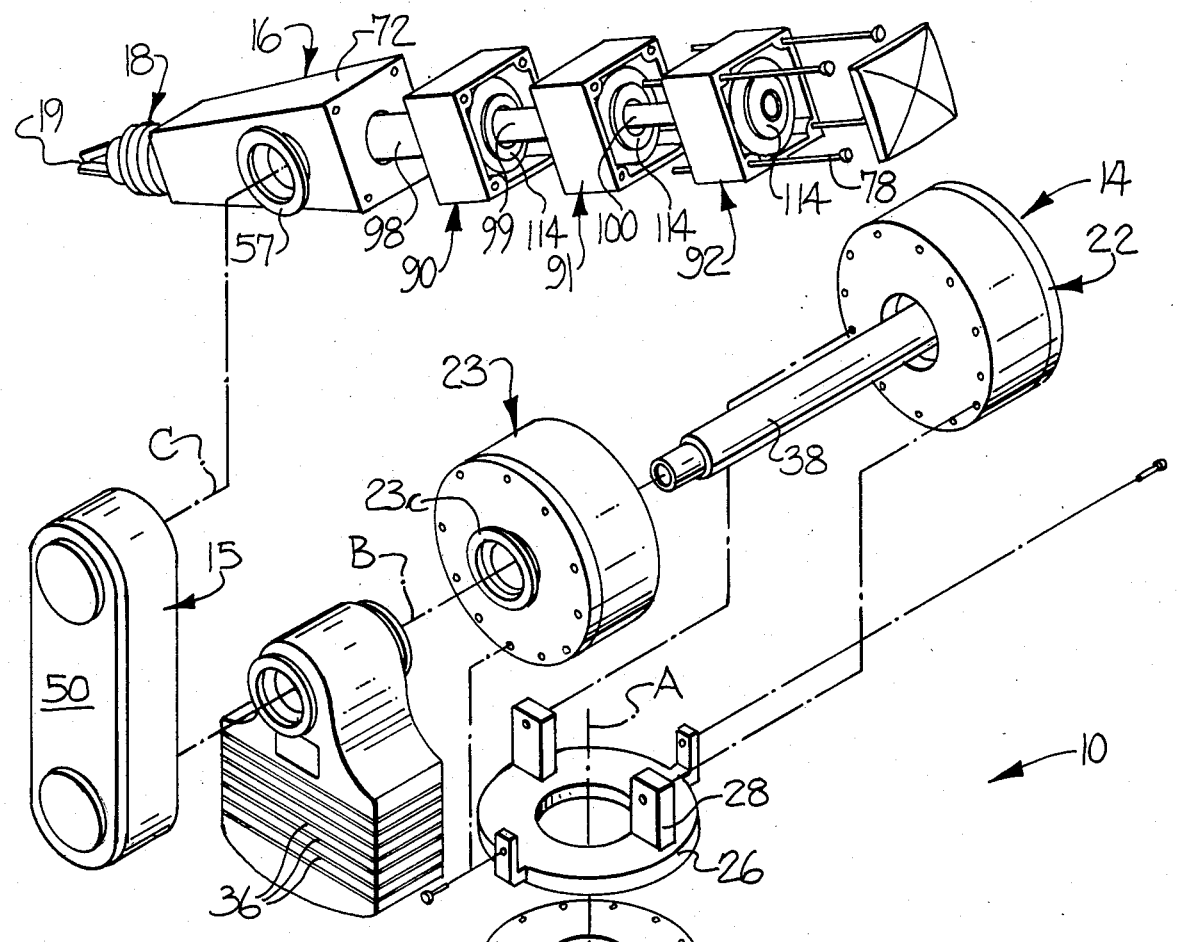
FIG. 3 is an exploded perspective view illustrating the components of the robot.

Referring more particularly to the drawings, an industrial robot embodying the features of the present invention is illustrated generally at 10. In the illustrated embodiment, the robot 10 is adapted to move through six axes of movement, and it comprises a main frame 12 which includes a support stand 13, with the stand defining a generally vertical axes A (FIG. 3). A waist 14 is rotatable with respect to the stand and defines a generally horizontal axis B which is perpendicular to and intersects the axis A. A first or inner arm 15 is rotatable with respect to the waist about the horizontal axis B, and a second or outer arm 16 is rotatable with respect to the inner arm about a second horizontal axis C, which is parallel to and laterally spaced from the axis B. A hand assembly 18 including a gripper 19 is mounted at one end of the outer arm assembly 16, and is adapted to move through three additional axes of movement, in the manner further described below. In addition, the main frame of the robot includes a control box 20 mounted adjacent the stand 13 for housing the electronic controls for the various drive motors of the robot.

As best seen in FIG. 2, the robot 10 further includes a first drive unit 21 having a tubular base component 21a and a secondary component 21b which is rotatable with respect to the base component about the axis A. The base component 21a is fixedly connected to the support stand 13 by means of a mounting flange 21c and a releasable V-band coupler 25 as further described in applicant's copending application Ser. No. 524,839.

A carriage 26 is fixed to the secondary component 21b of the first drive unit 21 by bolts (not shown), and the carriage includes upright parallel brackets 28 which mount a second drive unit 22 and a third drive unit 23, and which collectively form a part of the waist 14 of the robot. As will become apparent from the detailed description of the three drive units which follows, the three units are of substantially identical configuration, and this standardization greatly simplifies the design, construction, and repair of the overall apparatus, and promotes the interchangeability of parts. For present purposes, it will be seen that the second and third drive units 22, 23 each include a tubular base component 22a, 23a and a secondary component 22b, 23b which is relatively rotatable about the axis of its base component. The secondary components 22b, 23b are fixed to the brackets 28 of the carriage 26 and thus to each other by removable bolts 30 or the like, and such that the second and third drive units are coaxially disposed about the axis B. Also, the second and third drive units are disposed in opposite orientations as will be apparent from FIG. 4.

The third drive unit 23 includes output means in the form of a mounting flange 23c integrally formed at the end of the tubular base component 23a, and a tubular extension 32 which is releaseably connected to the flange 23c by means of a V-band coupler 25 of the type described above. The tubular extension 32 includes a second flange 35 at its other end for the purposes to be described. In addition, the extension mounts a number of weights 36 which serve to counterbalance the weight of the outer arm 16 during its movement about the axis B.

The second drive unit 22 includes output means in the form of a mounting flange 22c, and an elongate drive shaft 38 which extends coaxially through the base component 23a of the third drive unit and the extension 32. The drive shaft 38 includes a flange 39 at one end which is releaseably joined to the flange 22c of the base component of the second drive unit by another coupler 25.

Each of the three drive units includes drive means for relatively rotating its base component and secondary component about the associated axis of movement. For example, the drive means for the unit 21 includes an electrical motor which comprises a rotor 40 disposed coaxially about the rotational axis A and which is directly fixed to the base component 21a. Further, the electrical motor includes a stator 42 which is disposed coaxially about the rotational axis A and is directly fixed to the secondary component 21b. Thus as will be apparent, the direct connection between the rotor 40 and stator 42 of the motor and the operative components of the drive unit effectively eliminates the need for any drive train transmission between the motor and such components. The drive means for each of the other drive units 22 and 23 includes a like motor and which has its rotor and stator coaxially disposed about the axis of movement.

Brushless DC servo motors, such as electrical stepping motors, are suitable for use in the present invention. Electrical stepping motors are per se well known in the art and are operated by discrete electrical pulses which are fed in a sequential manner from a suitable switching control system. For every pulse fed to the motor, the motor rotates a fixed angle, and thus the number of pulses fed to the motor determines the rotational angle the motor will make. In order to obtain verification that the motor has in fact rotated, it is also common to mount a shaft encoder or resolver 44 on the output of the motor, which produces a verification feedback signal which monitors position and velocity. As one specific suitable example, a stepping motor may be utilized with the present invention which is manufactured by Motornetics Corporation of Santa Rosa, Calif., and which is designed for 153,600 steps per revolution.

The inner arm 15 of the robot comprises a casing 50, which has a mounting flange 51 at one end which is releaseably connected to the flange 35 of the extension 32 by still another coupler 25, which also conforms to the structure of the other couplers utilized on the robot. The shaft 38 from the second drive unit extends coaxially through the flange 51 of the casing, and mounts a sprocket 54 at the free end thereof.

A second shaft 55 is rotatably mounted at the other end of the casing 50, and is disposed coaxially about the horizontal axis C, which is parallel to and laterally spaced from the horizontal axis B. The shaft 55 includes an integral flange 56 which mates with a flange 57 on the supporting housing 70 of the outer arm 16, and the two flanges are joined by a further V-band coupler 25. The second shaft 55 mounts a sprocket 61 within the casing 50 of the inner arm, and a flexible endless toothed belt 62 is operatively entrained about the sprockets. By this arrangement, the rotation of the base component 22a of the second drive unit 22 is transmitted to the outer arm assembly 16, causing the outer arm assembly to rotate about the axis C. Also, the rotation of the base component 23a of the third drive unit 23 is transmitted to the inner arm 15, causing the inner arm to rotate about the axis B.

The outer arm assembly 16 comprises a supporting housing 70, which includes a forward housing component 72 and three serially arranged motor housings 74, 75, and 76 which are interconnected by the bolts 78 (FIG. 3). The assembly 16 further includes the hand assembly 18 and gripper 19 mounted at one end thereof, and three stepping motors 90, 91, 92 mounted to respective ones of the motor housings at the other end of the assembly 16 for operatively moving the hand assembly 18 about its three axes of movement. More particularly, the hand assembly 18 includes a frame member 94, a transverse wrist pin 95 mounted to the frame member, and a wrist rotary member 96 rotatably mounted with respect to said frame member 94. The gripper 19 is mounted to the wrist rotary member 96, with the fingers of the gripper being pneumatically movable in either the opening or closing direction by separate air pressure lines 97a, 97b, which may extend coaxially through the outer arm assembly in the manner illustrated in copending application Ser. No. 443,156.

The forward housing component 72 of the outer arm assembly 16 supports one end of three coaxially disposed and relatively rotatable tubular members 98, 99, 100, for transmitting the desired movements to the components of the hand assembly from the respective drive motors 90, 91, 92. More particularly, there is provided a first tubular member 98 which defines the central axis of the assembly 16 and which is rotatably supported in the forward housing component 72 by bearings. The tubular member 98 includes a yoke 102 at the outer end which mounts the transverse wrist pin 95. Thus rotation of the first tubular member 98 results in the rotation of the entire hand assembly 18 about the central axis of the outer arm assembly, which is commonly referred to as "wrist rotation". The second tubular member 99 is rotatably supported coaxially within the first member by bearings, and it includes a bevel gear 104 at its outer end. The bevel gear 104 meshes with a gear 105 which is disposed about the axis of the wrist pin 95 and which is fixed to the frame member 94 of the hand assembly. Thus rotation of the second tubular member 99 causes the frame member 94 to pivot about the axis of the wrist pin, commonly referred to as "wrist flex".

The third tubular member 100 is rotatably mounted coaxially within the second member, and it also includes a bevel gear 107 at the outer end thereof. The bevel gear 107 meshes with an idler gear 108 rotatably mounted about the axis of the wrist pin, and which in turn meshes with a bevel gear 109 on the end of the wrist rotary member. Thus rotation of the third tubular member 100 causes the wrist rotary member to rotate with respect to the frame member, commonly referred to as "hand rotation".

The three motors 90, 91, and 92 are adapted to selectively rotate each of the three tubular members about the common central axis, and relative to each other. More particularly, each of these three motors includes a rotor 110 and a stator 112, both of which are disposed coaxially about the central axis. In addition, each motor includes a tubular central opening 113 which extends therethrough coaxially with the central axis. The rotor 110 of each motor is fixed to the end of one of the tubular members by end plates 114, and the stator is fixed to the respective one of the motor housings 74, 75, 76 of the supporting housing. Further, the ends of the tubular members terminate in a serial arrangement, with all three tubular members extending coaxially through the opening 113 of the motor 90, and with the tubular members 99 and 100 extending through the opening of the motor 91. The motors are thereby serially arranged along the central axis of the assembly, and the need for any drive train transmission between the motors and tubular members is eliminated, thereby permitting a high degree of accuracy of movement, as well as providing a lightweight and compact design with a minimum number of parts. Also, the configuration of the outer arm assembly may be readily changed by changing the length of the tubular members and/or the number of motors. Each of the motors 90, 91, and 92 may also incorporate a resolver 116 for producing a verification signal of the position and velocity, and the motors may comprise stepping motors of the type manufactured by Motornetics Corporation and as described above.

In the drawings and specification, there has been set forth a preferred embodiment of the invention, and although specific terms are employed, they are used in a generic and descriptive sense only and not for purposes of limitation.

That which is claimed is:

1. A three axis arm assembly for an industrial robot comprising a supporting housing, a hand assembly including a frame member, a transverse wrist pin mounted to said frame member, and a wrist rotary member rotatably mounted with respect to said frame member, a rotatably mounted first tubular member defining a central axis, with said wrist pin of said hand assembly being transversely mounted at one end thereof, such that rotation of said first tubular member causes said wrist pin and frame member to rotate about said central axis, a second tubular member rotatably mounted coaxially within said first tubular member, first gear means operatively interconnecting one end of said second tubular member and said frame member of said hand assembly, such that rotation of said second tubular member causes said frame member to pivot about the axis of said wrist pin, a third tubular member rotatably mounted coaxially within said first tubular member, second gear means operatively interconnecting one end of said third tubular member and said wrist rotary member such that rotation of said third tubular member causes said wrist rotary member to rotate with respect to said frame member, and drive means for selectively rotating each of said first, second, and third tubular members about the common central axis thereof and relative to each other, said drive means comprising first, second, and third electrical motors mounted to said supporting housing adjacent the ends of said tubular members opposite said hand assembly, with each motor including a rotor and a stator each disposed coaxially about said central axis and further including a tubular central opening extending coaxially therethrough, with at least two of said tubular members extending through said tubular central opening of at least one of said motors, and with one of either the rotor or stator of each motor being fixed to a respective one of the ends of said tubular members and the other of the rotor or stator being fixed to said supporting housing, and such that the motors are serially arranged along said central axis.

2. An industrial robot having a plurality of axes of movement, and comprising a support member, a first drive unit having a base component fixedly mounted to said support member, a secondary component rotatably mounted with respect to said base component to define a first axis, and drive means for relatively rotating said base component and secondary component about said first axis, a second drive unit having a base component, a secondary component rotatably mounted with respect to its base component to define a second axis, means fixedly mounting said secondary component of said second drive unit to said secondary component of said first drive unit such that the second axis is non parallel to said first axis, output means fixed to said base component of said second drive unit and aligned coaxially with said second axis, and drive means for relatively rotating said base component and secondary component of said second drive unit about said second axis, a third drive unit having a base component, a secondary component rotatably mounted with respect to its base component to define a further axis, means fixedly mounting said secondary component of said third drive unit to the secondary component of said first drive unit such that said further axis is coaxial with said second axis, output means fixed to said base component of said third drive unit and aligned coaxially with said second axis, and drive means for relatively rotating said base component and secondary component of said third drive unit about said second axis, an inner arm, means connecting said inner arm to said output means of said third drive unit, an outer arm assembly, means pivotally connecting said outer arm assembly to said inner arm for relative rotation about a third axis disposed parallel to and laterally spaced from said second axis, and transmission means operatively connecting said output means of said second drive unit to said outer arm, whereby said inner arm may be pivoted about said second axis by said third drive unit, and said outer arm may be pivoted about said third axis by said second drive unit, said outer arm assembly comprising (a) a supporting housing, (b) a hand assembly including workpiece engaging means, (c) a plurality of tubular members coaxially mounted for rotation about a central axis, (d) means operatively interconnecting a first one of said tubular members with said workpiece engaging means to cause said workpiece engaging means to move about a first outer arm axis upon rotation of said first tubular member, (e) means operatively interconnecting a second one of said tubular members to said workpiece engaging means to cause said workpiece engaging means to move about a second outer arm axis upon rotation of said second tubular member, (f) drive means for selectively rotating each of said first and second tubular members about said central axis and relative to each other, said drive means comprising first and second electrical motors mounted to said supporting housing, with each motor including a rotor and a stator each disposed coaxially about said central axis and further including a tubular central opening extending coaxially therethrough, with at least one of said tubular members extending through said tubular central opening of at least one of said motors, and with one of either the rotor or stator of each motor being fixed to a respective one of said tubular members and the other of the rotor or stator being fixed to said supporting housing, and such that the motors are serially arranged along said central axis.

3. The industrial robot as defined in claim 2 wherein said hand assembly further comprises a frame member, with said workpiece engaging means mounted to said frame member, and a transverse wrist pin mounted to said frame member, and wherein said means operatively interconnecting said first tubular member with said workpiece engaging means comprises means fixing said wrist pin to said first tubular member so that said wrist pin and said frame member rotate with said first tubular member about said central axis, and wherein said means operatively interconnecting said second tubular member to said workpiece engaging means comprises gear means operatively interconnecting said second tubular member and said frame member such that rotation of said second tubular member causes said frame member to pivot about the axis of said wrist pin.

4. The industrial robot as defined in claim 3 wherein said hand assembly further comprises a rotary member rotatably mounted to said frame member, with said workpiece engaging means mounted to said rotary member, and further comprising means operatively interconnecting a third one of said tubular members with said rotary member of said hand assembly to cause said rotary member to rotate about a third outer arm axis upon rotation of said third tubular member, and wherein said drive means further comprises means for selectively rotating said third tubular member about said central axis and which comprises a third electrical motor of like construction and coaxially arranged with respect to said first and second motors.

5. An industrial robot having a plurality of axes of movement, and comprising a support member, a first drive unit having a base component fixedly mounted to said support member, a secondary component rotatably mounted with respect to said base component to define a first axis, and drive means for relatively rotating said base component and secondary component about said first axis, a second drive unit having a base component, a secondary component rotatably mounted with respect to its base component to define a second axis, means fixedly mounting said secondary component of said second drive unit to said secondary component of said first drive unit such that the second axis is non parallel to said first axis, output means fixed to said base component of said second drive unit and aligned coaxially with said second axis, and drive means for relatively rotating said base component and secondary component of said second drive unit about said second axis, a third drive unit having a base component, a secondary component rotatably mounted with respect to its base component to define a further axis, means fixedly mounting said secondary component of said third drive unit to the secondary component of said first drive unit such that said further axis is coaxial with said second axis, output means fixed to said base component of said third drive unit and aligned coaxially with said second axis, and drive means for relatively rotating said base component and secondary component of said third drive unit about said second axis, an inner arm, means connecting said inner arm to said output means of said third drive unit, an outer arm assembly, means pivotally connecting said outer arm assembly to said inner arm for relative rotation about a third axis disposed parallel to and laterally spaced from said second axis, and transmission means operatively connecting said output means of said second drive unit to said outer arm, whereby said inner arm may be pivoted about said second axis by said third drive unit, and said outer arm may be pivoted about said third axis by said second drive unit, said outer arm assembly comprising (a) a supporting housing,
(b) a hand assembly including a frame member, a transverse wrist pin mounted to said frame member, and a wrist rotary member rotatably mounted with respect to said frame member,
(c) a rotatably mounted first tubular member defining a central axis, with said wrist pin of said hand assembly being transversely mounted at one end thereof, such that rotation of said first tubular member causes said wrist pin and frame member to rotate about said central axis,
(d) a second tubular member rotatably mounted coaxially within said first tubular member,
(e) first gear means operatively interconnecting one end of said second tubular member and said frame member of said hand assembly, such that rotation of said second tubular member causes said frame member to pivot about the axis of said wrist pin,
(f) a third tubular member rotatably mounted coaxially within said first tubular member,
(g) second gear means operatively interconnecting one end of said third tubuar member and said wrist rotary member such that rotation of said third tubular member causes said wrist rotary member to rotate with respect to said frame member, and
(h) drive means for selectively rotating each of said first, second, and third tubular members about the common central axis thereof and relative to each other, said drive means comprising first, second, and third electrical motors mounted to said supporting housing adjacent the ends of said tubular members opposite said hand assembly, with each motor including a rotor and a stator each disposed coaxially about said central axis and further including a tubular central opening extending coaxially therethrough, with at least two of said tubular members extending through said tubular central opening of at least one of said motors, and with one of either the rotor or stator of each motor being fixed to a respective one of the ends of said tubular members and the other of the rotor or stator being fixed to said supporting housing, and such that the motors are serially arranged along said central axis.

6. The industrial robot as defined in claim 5 wherein said drive means of each of said first, second, and third drive units comprising an electrical motor having a rotor disposed coaxially about the associated rotational axis and being directly fixed to one of either said base component or said secondary component thereof, and a stator disposed coaxially about the associated rotational axis and being directly fixed to the other of said base component or said secondary component thereof.

7. The industrial robot as defined in claim 6 wherein said first and second axes perpendicularly intersect.

8. The industrial robot as defined in claim 7 wherein said base component and output means of said third drive unit are tubular, and said output means of said second drive unit includes a shaft extending coaxially through said base component and output means of said third drive unit.

9. The three axis arm assembly as defined in claim 1 wherein said hand assembly further includes workpiece engaging means mounted at the outer end of said wrist rotary member, and wherein said wrist rotary member is tubular such that control lines for said workpiece engaging means are adapted to pass coaxially through the innermost of said tubular members, past said wrist pin, and through said tubular wrist rotary member and to said workpiece engaging means.

10. The three axis arm assembly as defined in claim 9 wherein each of said first, second, and third electrical motors of said drive means comprises a stepping motor.

* * * * *